United States Patent [19]

Thomas

[11] 4,343,261

[45] Aug. 10, 1982

[54] ANIMAL CAGING SYSTEM

[76] Inventor: William R. Thomas, 187 Main St., Conyngham, Pa. 18219

[21] Appl. No.: 206,058

[22] Filed: Nov. 12, 1980

Related U.S. Application Data

[63] Continuation-in-part of Ser. No. 76,698, Sep. 18, 1979, abandoned.

[51] Int. Cl.$^3$ .................................................. A01K 1/03
[52] U.S. Cl. .......................................... 119/15; 119/17
[58] Field of Search .................. 119/15, 17, 18, 19, 119/34; 128/1 R, 1 B

[56] References Cited

U.S. PATENT DOCUMENTS

| | | | |
|---|---|---|---|
| 1,823,584 | 9/1931 | Bruce . | |
| 1,839,673 | 1/1932 | Hartmann . | |
| 1,863,982 | 6/1932 | Hatch . | |
| 2,129,786 | 9/1938 | Sacre | 119/17 |
| 2,335,173 | 11/1943 | Corey | 119/21 |
| 2,682,061 | 6/1954 | McConnell | 5/97 |
| 2,698,599 | 1/1955 | Kalmoe . | |
| 2,702,503 | 2/1955 | Wildhaber | 98/33 |
| 2,703,570 | 3/1955 | Young, Jr. | 128/1 R |
| 2,857,880 | 10/1958 | Stone | 119/17 |
| 2,988,044 | 6/1961 | Adelberg et al. | 119/15 |
| 3,087,458 | 4/1963 | Bennett | 119/17 |
| 3,159,139 | 12/1964 | Haggard et al. | 119/17 |
| 3,195,505 | 7/1965 | Hauth et al. | 119/17 |
| 3,196,834 | 7/1965 | Hall | 119/34 |
| 3,220,383 | 11/1965 | Bruner | 119/17 |
| 3,237,599 | 3/1966 | Torrey et al. | 119/19 |
| 3,302,615 | 2/1967 | Tietje | 119/15 |
| 3,308,789 | 3/1967 | Artig | 119/19 |
| 3,326,203 | 6/1967 | Goertzel | 128/1 B |
| 3,343,520 | 9/1967 | Schwarz | 119/15 |
| 3,381,663 | 5/1968 | Dayton | 119/15 |
| 3,464,388 | 9/1969 | Stout | 119/15 |
| 3,524,431 | 8/1970 | Graham | 119/19 |
| 3,537,428 | 11/1970 | Montgomery | 119/18 |
| 3,550,558 | 12/1970 | Sachs | 119/15 |
| 3,557,756 | 1/1971 | Ramsey | 119/15 |
| 3,630,174 | 12/1971 | Runkle | 119/45 |
| 3,662,713 | 5/1972 | Sachs | 119/18 |
| 3,673,987 | 7/1972 | Fletcher | 119/19 |
| 3,687,330 | 8/1972 | Herolzer | 220/41 |
| 3,710,761 | 1/1973 | Gregory | 119/19 |
| 3,731,657 | 5/1973 | Alessio | 119/17 |
| 3,749,061 | 7/1973 | Connelly | 119/19 |
| 3,754,676 | 8/1973 | Box | 220/31 |
| 3,771,686 | 11/1973 | Brison | 220/4 R |
| 3,791,347 | 2/1974 | Lovell | 119/19 |
| 3,826,229 | 7/1974 | Classe | 119/17 |
| 3,830,200 | 8/1974 | Patterson | 119/15 |
| 3,830,201 | 8/1974 | Coulbourn | 119/17 |
| 3,877,420 | 4/1975 | Eagleson | 119/15 |
| 3,892,201 | 7/1975 | Crawford | 119/17 |
| 3,919,978 | 11/1975 | Schaefer | 119/19 |
| 3,924,571 | 12/1975 | Holman | 119/15 |
| 3,924,572 | 12/1975 | Classe | 119/17 |
| 3,930,467 | 1/1976 | Fier | 119/19 |
| 3,962,994 | 6/1976 | Petrucciani | 119/19 |
| 3,990,398 | 11/1976 | Davis | 119/17 |
| 3,990,399 | 11/1976 | Davis | 119/17 |
| 4,023,529 | 5/1977 | Landy | 119/15 |
| 4,085,705 | 4/1978 | Gland et al. | 119/17 |
| 4,089,571 | 5/1978 | Landy | 128/1 B |
| 4,249,482 | 2/1981 | Harr | 119/17 |

FOREIGN PATENT DOCUMENTS 462557 3/1937 United Kingdom .
1308817 3/1973 United Kingdom .

OTHER PUBLICATIONS

V. Riley & D. Spackman, "Housing and Stress," Article in *Lab Animal*, May—Jun. 1977, pp. 16-21.

Lab Products, Inc. Brochure, Dec. 1976.

E. P. Les, *39th Annual Report of the Jackson Laboratory*, Bar Harbor, ME, P111 (1967-1968).

E. P. Les, "Saving Space with Individual Cage Ventilation for Mice," *Abstract of Presentation to AALAS*, Nov. 16-21, 1975.

E. P. Les, "Evaluation of Pressurized Individually Ventilated Mouse Cages," *47th Annual Report of Jackson Lab.*, P106, 1975-1976.

E. P. Les, "Improving the Microenvironment of Mouse Cages," *Schedule of Presentations to AALAS*, Jun. 3-4, 1976.

E. P. Les, "Pressurized, Individually Ventilated and Individually Exhausted Caging," *48th Annual Report of Jackson Lab.*, 1976-1977.

E.P. Les, "Pressurized, Individually Ventilated Caging and Its Effect on Reproduction of A/J and DBA/2J Mice," *Abstract of Presentation to AALAS*, Oct. 2–7, 1977.
C. M. Lang and G. McGarrity, "Bioprotective Caging Systems," *Lab Animal*, Sep.-Oct. 1973.
The Baker Company, Inc., Brochure on "Anigard" System, Apr. 19, 1973.
E. P. Les, "Ventilated Cages for Mice," *Abstract of Presentation to AALAS*, Oct. 21–25, 1968.
E.P. Les, "Individually Ventilated Cages for Mice," *44th Annual Report of Jackson Laboratory*, p. 107 (1972–1973).
E. P. Les, "Saving Space with Individual Cage Ventilation for Mice," *46th Annual Report, Jackson Lab.*, p. 106–107 (1974–1975).
F. L. Horsfall, Jr. & J. H. Bauer, "Individual Isolation of Infected Animals in a Single Room," 40 *J. Bacteriology* 569–580 (1940).
A. C. Andersen, "Air Conditioned Cages Designed to Minimize Kennel Problems," 14 *Laboratory Animal Care* 292–303 (1964).
V. Riley, "Protective Ventilated Shelves for Experimental Animal Storage," *Abstract of Presentation to AALAS*, 10/16/72.

*Primary Examiner*—Hugh R. Chamblee
*Attorney, Agent, or Firm*—Steele, Gould & Fried

[57] ABSTRACT

An improved animal caging system of the type having a plurality of ventilated cages suspended on flanges from a plurality of shelves is provided. The ventilation duct system is entirely enclosed and forms an integral part of the caging system rack. Valves mounted in the air ducts or inlets on the cages, for controlling airflow to and from cages, and an arrangement for a tight fit between the cages and the ducts minimize the possibility of cross-infection between occupants of different cages, and between people and cage occupants. The valves are actuated upon insertion of the cage into the rack, whereby the cages and/or air ducts are sealed upon withdrawal. A negatively pressurized isolation box, adapted to interface with the cage rack, permits manipulation and servicing of cages and occupants, resulting in a contagion-safe total system.

16 Claims, 13 Drawing Figures

ANIMAL CAGING SYSTEM

CROSS REFERENCE TO RELATED APPLICATION

This Application is a Continuation in-part of my co-pending Application Ser. No. 076,698, filed Sept. 18, 1979, now abandoned.

BACKGROUND OF THE INVENTION

1. Field of the Invention

This invention relates to the field of animal housing, and most advantageously to the housing, servicing and transportation of laboratory animals requiring isolation from contagion or isolation of contagion, using individually removable animal cage units.

2. Description of the Prior Art

In the art of housing animals, multi-unit systems are employed for a variety of applications. These applications range from pet stores to demanding laboratory experimentation. Problems that develop when confining a large number of animals in close proximity with one another include unpleasant odors, inadequate air supply, cross-infection and difficulty with installation and removal of individual cage units. In laboratory experimentation applications, animals are usually divided into a subject group and a control group, the subject group receiving a treatment under investigation while the control group is spared. When the subject group in an experiment is subjected to disease organisms, valid experimental results demand that the control group have absolutely no exposure to the disease in question. In addition, completely pathogen-free animals are required for some experiments. Production of such ultra-pure animals requires the ultimate in isolation.

Housing a large number of animals poses problems in supplying animals with basic needs such as air and food, as well as the aforesaid problem of infection. In some prior art systems, banks of animal units have been individually fitted with pipe connections to supply and exhaust air, and sometimes to flush refuse from the animal housing unit. When a large number of animal units are mounted in a relatively small space, this maze of individual connections can be a nightmare for the person servicing the animals. This problem is only partially solved in systems that employ press-fit tube connections. On insertion of an animal unit in a system employing press-fit connections, the installer must visually line up the receptacle in the animal unit with the pipe in the rear of the mounting rack before the cage can be put in its final position. Inexact lineup of cages wastes supply air, may introduce pathogens, and may release contagion-bearing exhaust air. The complexity and inconvenience of individually piped systems clearly generates a substantial expense upon purchase and with continuing use, to laboratories that employ them.

In less demanding applications where some cross-ventilation can be tolerated, former animal housing systems have often employed laminar flow ventilation. In laminar flow ventilation systems, air is supplied via a plenum over an entire bank of animal units. Theoretically, in such a system all the portions of cage ventilation air move parallel to all the other portions, out of the plenum and across the animal units. It is intended that each cage unit receive air directly from the plenum, and discharge air without cross-ventilation to or from other units. Practically, the laminar flow ventilation method is not particularly effective at eliminating cross-ventilation. Discontinuities encountered in the path of the air mass generate eddy currents which preclude uniform air motion. Eddy currents and surface currents produce a random movement of air, sometimes directly opposite the movement of the larger directed air mass. This phenomenom is analogous to the way a canoeist can be more easily carried up river by staying close to the river bank.

Laminar air flow systems are generally designed to supply clean air across a bank of cages, then direct the air into the room where the animal housing system is kept. When laminar air flow systems are so designed to exhaust into the room, persons allergic to the dander of laboratory animals, and all persons in installations where communicable disease experiments are carried out, must be equipped with personal protective equipment. If a plenum is used both on the air supply side and on the exhaust side, not only will the animals be enclosed and unobservable, but insertion and removal of animal units will be extremely inconvenient.

It will be appreciated that problems with cross-ventilation and problems with convenience of installation and removal often involve a trade-off. If a system is completely airtight, installation and removal are likely to be inconvenient, requiring connection or disconnection of some sort of coupling. Conversely, a system which features convenience of installation and removal will generally do so at the expense of dependable, airtight couplings. The present invention seeks to resolve this dichotomy in a system applicable to a range of applications.

The present invention provides a system whereby the cross-ventilation advantages of an individually-piped system are obtained, as well as the installation and removal convenience of a one-sided laminar flow system. The animal cages are individually removable, yet tapered flanges and gasketing allow the cages to be fitted tightly against the supply and exhaust ducts in a way as effective at reducing cross-ventilation as the individual piping method. Baffles may be mounted in the air ducts to minimize eddy and surface currents, and also help to minimize any cross-ventilation. For the most demanding applications, an airtight valve arrangement provides safe and secure connection. The support rack for the unit is hollow and also serves the function of duct work for supply of air to the individual cages and exhaust therefrom. The system is thus compact and convenient, solving both cross-ventilation and installation-removal problems in one.

Finally, the system is widely applicable due to inexpensive yet sturdy and dependable construction. In simple embodiment, it is useful in pet stores and non-demanding laboratory work. In a strongly-constructed unit, it is useful as a portable environment for shipping animals. In the most demanding laboratory contagious disease experiments, the full panoply of sealed cages and valves can be used in conjunction with an isolation work chamber for maximum protection. The isolation work chamber is adapted to interface with the cage rack whereby individual cages can be withdrawn, serviced and reinserted. The total system thus can be employed to produce pathogen-free animals or to conduct communicable disease experiments, in addition to merely housing and transporting animals.

SUMMARY OF THE INVENTION

It is the object of this invention to provide a high density animal housing system that is as convenient to service as a laminar flow ventilated system, and as effective at reducing cross-ventilation as an individually piped system.

It is also an object of this invention to minimize the space required for duct work and to more effectively utilize available space for cages and for service of cages in a multi-unit cage system.

It is also an object of this invention to protect occupants of a multi-unit cage system from air that has had contact with occupants of other units, and from the dander, refuse and airborne contagion of such other occupants.

It is another object of this invention to ensure that the occupants of a multi-unit cage system and the human occupants of the area wherein such system is located to not suffer from diseases or allergic reactions caused by cross-ventilation between their air and that of their respective counterparts.

It is still another object of this invention to provide as airtight a fit as convenience in a range of uses will allow between the cages in a multi-unit caging system and the ducts supplying and exhausting air to and from said cages, while precluding the necessity of careful alignment of cages with the ducts.

It is yet another object of this invention to provide a total pathogen-protected system for housing and servicing animals including housing, ventilation and servicing apparatus which interface with one another.

These and other objects of this invention are accomplished by the animal caging system which comprises: a hollow rack structure having an air input source and an exhaust opening therein; at least one hollow end face mounted on said hollow rack structure and comprising an air supply duct open to air flow from said air input source and an air exhaust duct open to air flow to said exhaust opening; a plurality of hollow shelves disposed between the end faces, each said hollow shelf being internally lengthwise divided into ducts, for example, a center shelf duct and two side shelf ducts; each said hollow shelf having means to support cages which are inserted thereunder, said center shelf ducts being open to air flow from said air supply duct, and having openings to each cage suspended thereunder and means for controlling air flow from said center shelf duct into the cage below, said side shelf ducts being open to air flow to said exhaust duct, and having openings from each cage suspended thereunder and means for controlling air flow into said side shelf duct from the cage below, said cages being constructed of material impervious to air, and closed on all sides except as required for air flow.

The openings between the cages and the air supply and exhaust ducts may be fitted with baffles directing air into and out of the cages, in an embodiment with cages having open tops. A more airtight connection may be achieved in another embodiment by use of cage lids. Sealing rings of rubber or other flexible material are fitted in depressions along the surfaces of the lids between the cage lids and flanges on the upper edge of the cage bodies and between air openings in the lids and the ducted shelves. The lids may also comprise valves mounted in air openings the valves having spring-loaded pistons. When a cage is inserted, the valves are forced open to supply and exhaust air. Upon removal of a cage, the valves close by release of the pistons to prevent the escape or access of contagion.

In alternative embodiments, one hollow end face comprising two supply and two exhaust ducts, or two hollow end faces, one a supply duct and one an exhaust duct, are provided. The shelves are divided into shelf ducts open to the appropriate supply and exhaust ducts at the ends thereof.

A tight fit between the cages and the hollow shelves is accomplished by the aforesaid system also comprising: flat shelf flanges mounted under each hollow self; and, cage flanges along the top edge of said cages, upon which said cages are slideably insertable and removable along said shelf flanges, each said cage flange having a thicker flat center area, and two sloping areas to either thinner end of said cage flange, said thicker flat center area being of the same thickness as the space between said shelf flange and said hollow shelf. A like result is obtained in a system wherein said shelf flanges mounted under each said hollow shelf have two sloping areas from a thinner central area to thicker short flat areas at either end of said shelf flange; and said cage flanges along the top edge of said cages are flat, and of the same thickness as the space between said hollow shelf and said short flat areas at either end of said shelf flange. In either of the foregoing embodiments, the effect is to press the inserted cage against the shelf duct.

In an embodiment employing open-top cages, the means for controlling air flow comprises baffles disposed in the openings between said hollow shelves and said cages, and curved in a direction opposite air flow. The baffles are of increasing length and width in the direction of air flow for those openings in said air supply duct, and of decreasing length and width in the direction of air flow in said exhaust duct. One embodiment is disclosed with air filtration and impelling means housed in a hollow bottom of the rack structure, provided for the air input, the air output, or both. Another system is disclosed with means for connecting the rack structure to an external ventilating system, whereby the vibration of the ventilating system is removed from the occupants of the cages.

For maximum isolation, valved closed-top cages are employed in conjunction with a mobile isolation work chamber. The work chamber interfaces with the cage rack to permit insertion and removal of cages directly to and from the work chamber.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE DRAWINGS

Figure 1:
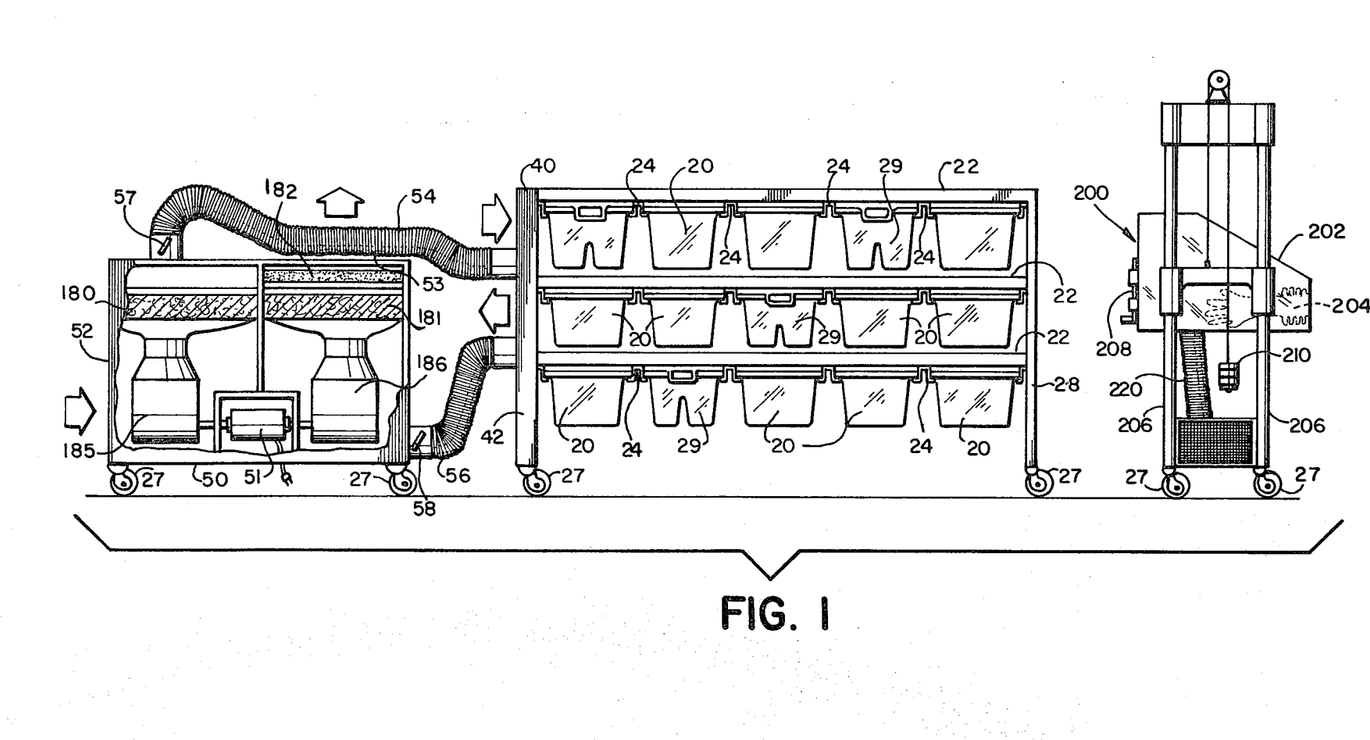
FIG. 1 is a plan view of the complete system of the invention, the ventilation apparatus shown cutaway.
Figure 2:
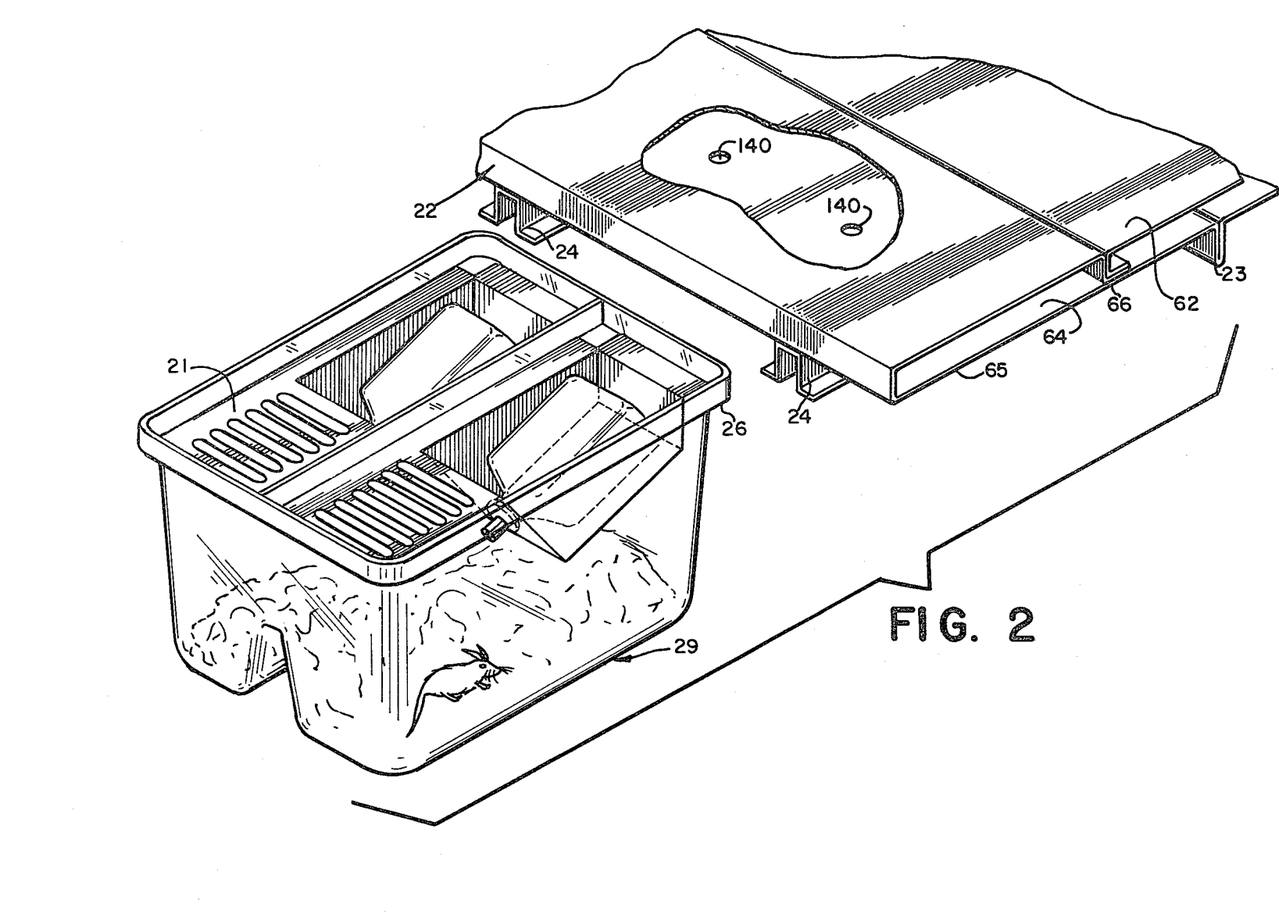
FIG. 2 is a perspective view illustrating installation and removal of a typical animal unit in a system having open-top cages.

FIG. 1 illustrates the multi-unit animal caging system of this invention. As also shown in FIG. 2, in a multi-unit system of this kind, animal cages 20 are suspended on a rack structure 40 from hollow shelves 22, for example by means of shelf flanges 24. The animal cages 20 are equipped with cage flanges 26 which rest on shelf flanges 24 such that the cages 20 can be slideably inserted and withdrawn. The system holds cages 20 on both a front side 28 shown in FIG. 1, and a rear side, not shown.

An air input source 52 draws air into the system. The air supply can be conveniently provided by the external system 50 of FIG. 1, ducted into the rack via flexible hoses 54, 56, or the supply can be built into the rack structure 40, for example, in a hollow bottom. To minimize vibration, the external system 50 is preferred. The ventilation apparatus 50 supplies air to the cages, and expels air from the system through an exhaust opening 53. The system's air input and exhaust may be connected to any appropriate source and to any appropriate discharge, for example, to a permanently-installed room ventilation plant.

Figure 3:
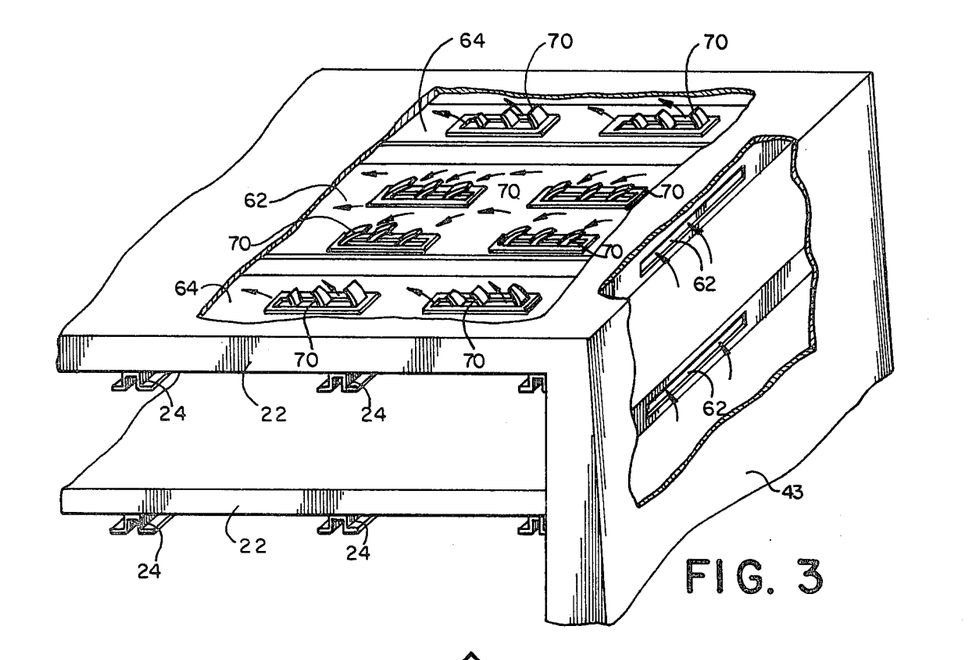
FIG. 3 is a perspective breakout view showing ducting and baffle arrangements within the system framework.
Figure 5:
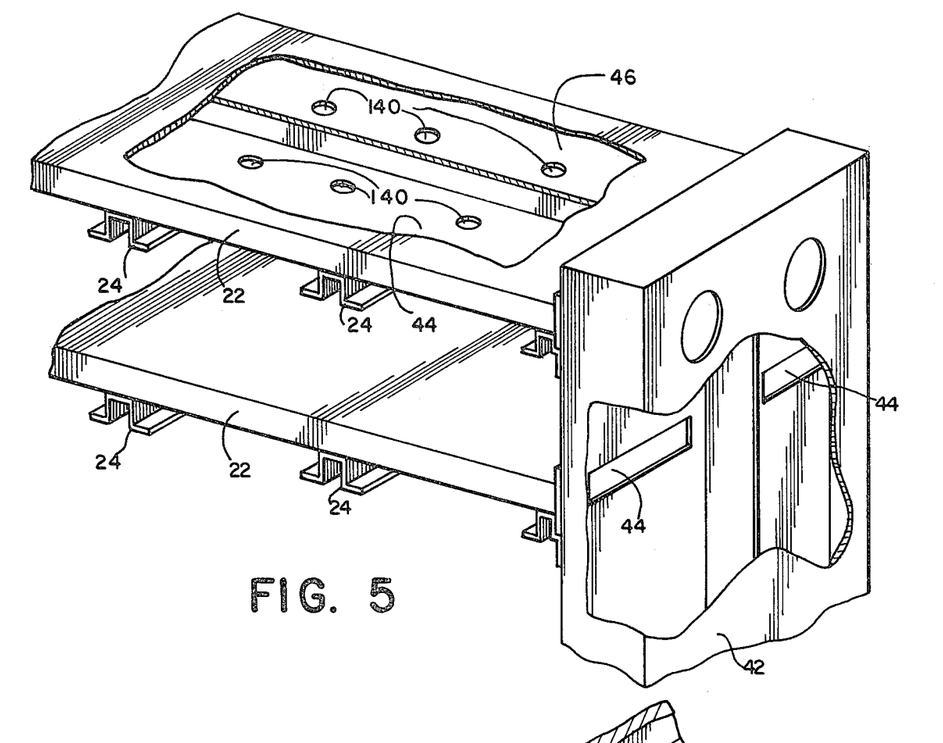
FIG. 5 is a perspective view of a system rack for a single depth embodiment.
Figure 8:
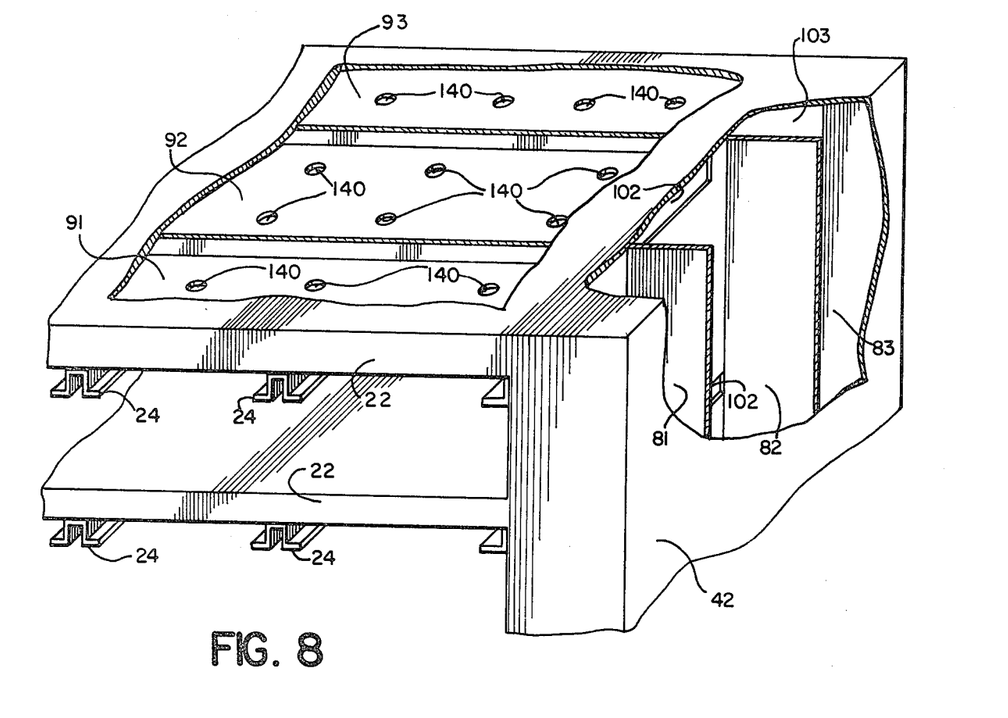
FIG. 8 is a perspective breakout view of an alternative duct and shelf duct arrangement.

The scheme of the invention is to provide complete duct work as integral parts of the structure supporting the cages. With reference to FIG. 1, air entering at input 52 is filtered and ducted into the rack structure 40 via hose 54. End face 42 is internally divided into supply and exhaust ducts which connect with corresponding shelf ducts for supply and exhaust to cages 20. Exhaust air is filtered for particulate matter and ammonia, and is finally expelled at exhaust opening 53. End face 42 of the rack structure, hollow and forming integral ducts as shown in FIGS. 5 and 8, connects air supply and exhaust to the integral ducts 44, 46 in each hollow shelf 22. Two hollow end faces 42, one end face open to airflow from air input source 52, and another end face to exhaust opening 53 can be constructed on either end of rack structure 40. Such an embodiment is shown in FIG. 3, where the entire depicted hollow side 43 is devoted to air supply, openings to shelves 22 being provided for supply only. An opposite hollow end face is necessary, open to airflow from the remaining shelf ducts for exhaust, in the same manner.

Each hollow shelf 22 is internally lengthwise divided into ducts, for example central duct 62 and two side shelf ducts 64 as integral parts of the shelf. The center and side shelf ducts may be separated by dividers within the hollow shelf as shown in FIG. 3. It is preferred, however, that shelf 22 be formed from only two pieces of sheet metal. As shown in FIG. 2, a long sheet 65 forms the entire bottom of shelf 22 and the top of the side ducts 64. A second sheet 63 covers center duct 62 only. This construction is inexpensive, yet ensures complete isolation between supply and exhaust.

Hollow shelves 11 are shown in FIG. 3 equipped with baffles 70 at each cage position. The baffles 70 direct airflow into and out of the cages 20, and minimize eddy currents in the center shelf duct 62 and side shelf ducts 64. The baffles 70 operate to minimize movement of contagion in a direction opposite airflow. The effectiveness of the baffles is increased by their curvature, and by use of larger baffles in the direction of input airflow, and smaller baffles in the direction of exhaust airflow, in keeping with aerodynamic principles.

A duplex type cage 21 is shown in FIG. 2, in position for insertion under shelf 22. Water bottles may be mounted in supporting mesh as shown, or water may be supplied in other ways as known in the art. Cage 21 is supported below shelf 22 by cage flanges 26 resting on shelf flanges 24. When fully inserted, cage 21 is stopped by protruding ridge 23, under shelf 22.

Figures 6, 7:
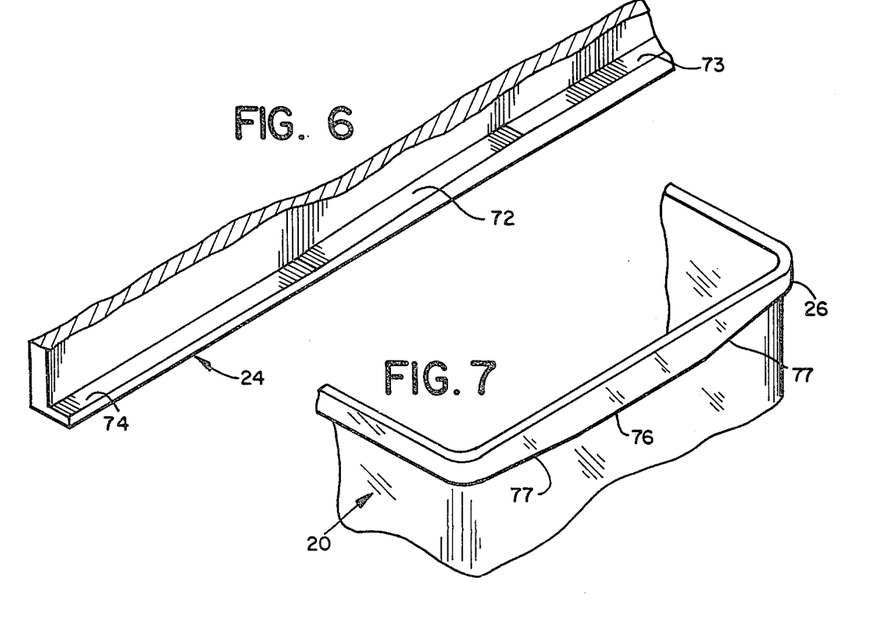
FIG. 6 is a perspective view of a shelf flange for use with a flat cage flange.
FIG. 7 is a perspective view of a cage flange for use with a flat shelf flange.

FIGS. 6 and 7 illustrate means for achieving a tight fit between cages 20 and hollow shelves 22 to minimize cross-ventilation. In FIG. 6, shelf flange 24 comprises a flat area 72 at the extreme of travel of cages 20, a sloping area 73 varying the thickness of said shelf flange from thicker at flat area 72 to thinner at the end of sloping area 73, and a lower flat area 74. The corresponding cage flange 26 has a width varying from thin at the ends of cage flange 26, sloping along inclined areas 77 to a central flat area 76, said central flat area occurring at a point where the width of the cage flange 26 is substantially equal to the clearance between shelf flange 24 and hollow shelf 22. Either cage flange 26 or shelf flange 24, or both, are constructed of a slightly yielding material such as plastic. As cage 20 is inserted below hollow shelf 22, little resistance is encountered until the cage flange 26 encounters sloping area 73. When fully inserted, cage 20 is held tightly against hollow shelf 22, the cage flange 26 resting upon central flat area 76. The shelf flanges 24 may be constructed to hold two cages, as for the double-sided rack shown, or may be constructed to hold one cage for a single-sided rack such as shown in FIG. 5, in which case the flange 24 would end near the middle of flat area 72.

In FIGS. 6 and 7 the dimensions of the flanges are exaggerated for purposes of illustration. In practice, an optimum combination of tight fit and ease of insertion is obtained, as applied to a system for mice, with central flat area 76 of about $3\frac{1}{2}$ inches length, inclined areas 77 of about $4\frac{1}{2}$ inches length, and the width of cage flange 26 varying from about 0.400 inches at central flat area 76 to about 0.370 inches at the corners of cage 20. The dimensions of shelf flange 24 correspond to those of the cage flange, whereby a flat shelf flange and the depicted cage flange 26 may be used together, or a flat cage flange and the depicted shelf flange 24, likewise. It is presently preferred that a flat shelf flange be used with the disclosed cage flange.

FIGS. 1, 5 and 8 illustrate embodiments where only one hollow end face 42 is required. In FIG. 8, hollow end face 42 comprises one wide air supply duct 82 and two air exhaust ducts 81 and 83. Each shelf 22 of the rack structure comprises corresponding shelf ducts for supply 92 and exhaust 91 and 93. Supply and exhaust ducts 81, 82, 83 communicate with supply and exhaust shelf ducts 91, 92, 93 through openings or passageways 101, 102, 103 respectively. Means are provided for connecting ducts 81, 82 and 83 to an external ventilation system, and are shown in FIG. 1, in the preferred embodiment. It will be appreciated that full width ducts as in FIG. 3, or two duct systems (for a one cage deep system) are also possible.

To summarize the foregoing, integral ducting for a unit having two hollow rack end faces or a single hollow rack end face, as well as appropriate corresponding shelf ducts may be provided as needed for systems of one-deep cages or two-deep cages.

Figure 4:
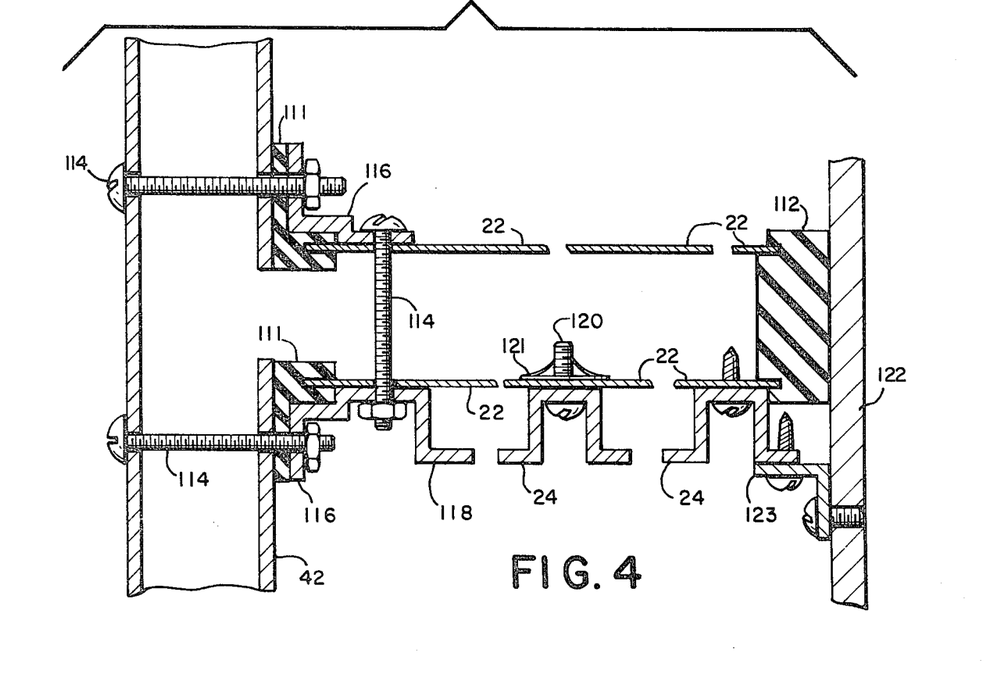
FIG. 4 is a plan view of a cross-section of a self and duct.

FIG. 4 illustrates the particulars of interconnection between hollow end face 42 and shelf 22. On the end of shelf 22 where the same are attached, a gasket 111 of rubber or similar material is compressed by bolts 114 and flange members 116, one of which flange members comprises a cage-supporting shelf flange 118. Shelf flange 24, of the standard variety, is affixed to shelf 22 via machine screw 120 and fastener 121. A sheet metal screw could also be used. With reference to FIG. 2, a screw should be provided through shelf flange 24 at the foldover between sheets 65, 63, that is, at junction 66. By this means, screw 120 affixes shelf flange 24 to shelf 22 and holds the parts of shelf 22 together at the same time.

At the end of shelf 22 opposite end face 42, a plug 112 of rubber or similar material seals shelf 22. This end of shelf 22 must also be supported, however, such support need not contain integral duct work. It is preferred that a standard shelf flange be attached to a rigid support 122, for example by angle member 123.

Figure 9A:
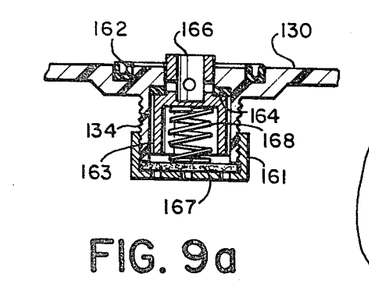
FIGS. 9(a) and 9(b) are section views of cage valves for output and input, respectively, FIG. 9(b) illustrating, in cross-section, the connection of shelf, lid and cage.
Figure 9B:
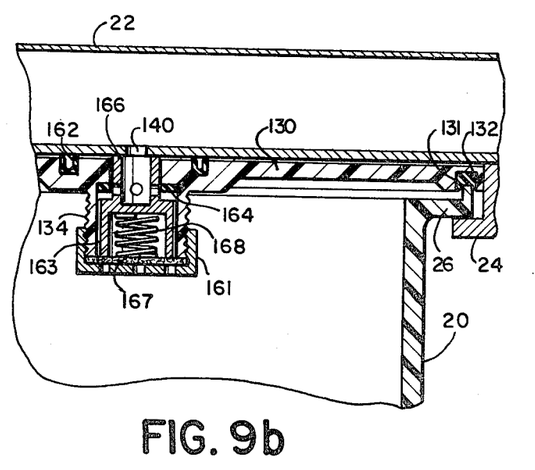
Figures 10, 11:
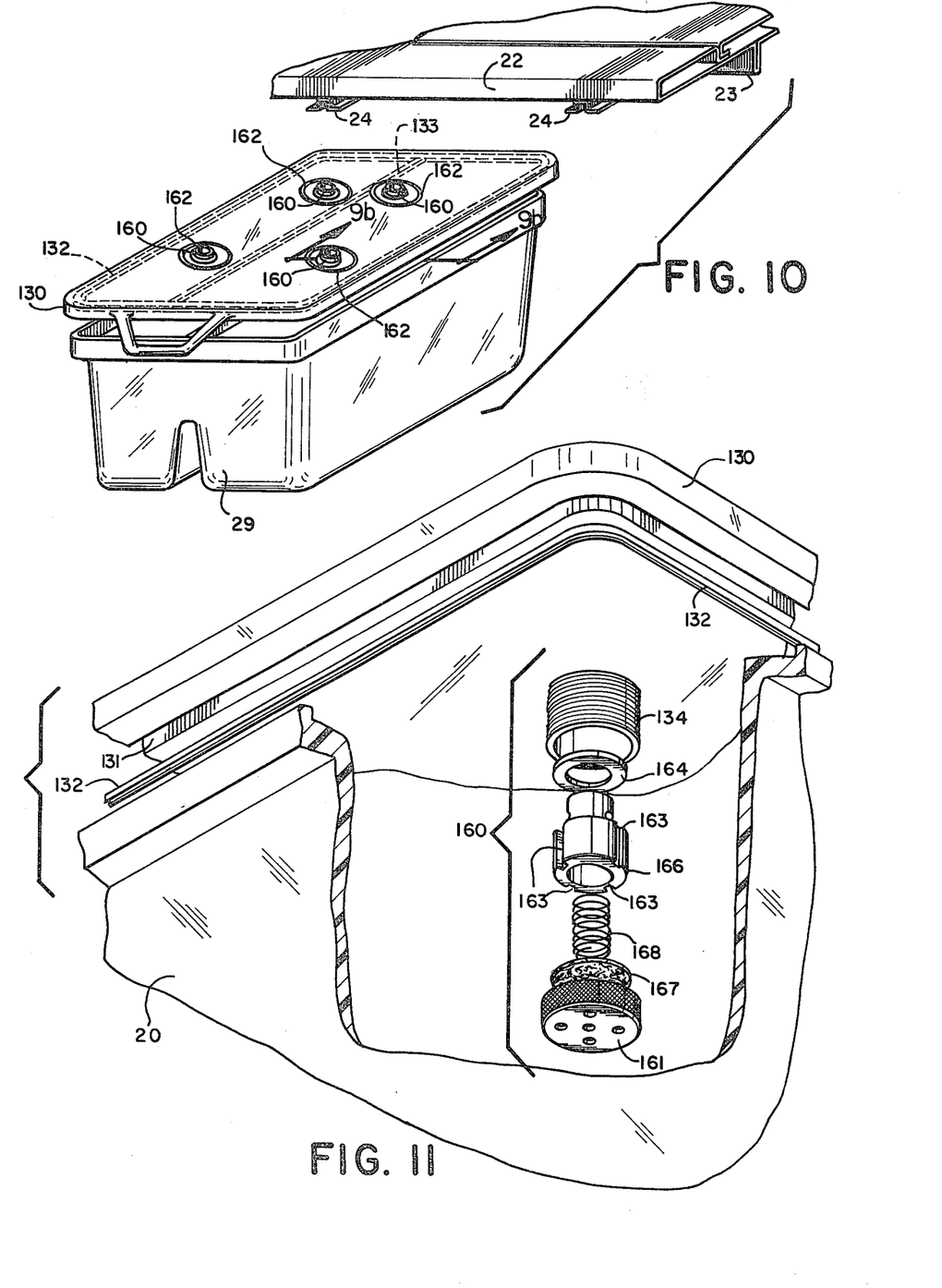
FIG. 10 is a perspective view of an embodiment featuring maximum airtight construction, employing a valved and fully sealed cage lid.
FIG. 11 is an exploded cutaway perspective view of a lid, valve and cage.

FIGS. 9 through 11 illustrate an embodiment using valves in closed-lid cages adapted to attach the cages to the air supply and exhaust ducts in the shelves. This embodiment is suited to the most demanding of laboratory applications in that it is airtight. A cage lid 130 fits tightly over cage 20. Cage lid seal ring 132 mounted in groove 131 insures an airtight fit between cage lid 130 and cage 20. Air controlling means comprising intake valves and exhaust valves is disposed on the cage lid, in staggered relationship, to mate with openings 140 in the underside of shelf 22. Staggering the valves ensures that the input valve will not cross the output opening, and vice versa, when the cage is inserted or withdrawn.

The cage 20 and cage lid 130 assembly is installed in the system under shelf 22 by positioning cage flange 26 on shelf flange 24 and sliding the assembly under said shelf, in the same manner as for the open-top cage embodiment. When the cage is fully inserted, however, the valves are pushed open to open the shelf ducts 91, 92 to the cage, via said valves. Inasmuch as valves 160 are held normally closed when the cage is not installed, the cages are sealed airtight. The openings in the shelf ducts are of a size slightly smaller than the bore in the valves. It will be appreciated that only a limited supply of air remains in the cage when removed from the rack.

Alternative air controlling means are also disclosed, for use in less demanding applications. Where cross-ventilation is tolerable, open top (i.e., lidless) cages are employed as in FIG. 2. Air controlling means comprising baffles 170 are mounted in the openings 140 in shelves 22, to direct airflow into and out of cages 20. In such a system, control of differential air pressure is important because the system leaks to some degree. With reference to FIG. 1, dampers 57, 58 are included to balance the supply and exhaust pressures. To provide maximum occupant protection, the supply pressure is adjusted to exceed the exhaust vacuum, allowing leaking supply and cage air into the room. To provide maximum protection to persons servicing the system, the exhaust vacuum is adjusted to exceed supply pressure, allowing some room air to leak into the cages.

A system of intermediate effectiveness comprises cage lids but no valves. Rather, a seal ring 162 surrounds the lid openings to seal lid 130 to shelf 22. Baffles 170 may be included, or a simple filter may be employed in place of baffles 170 to prevent dander and bedding material from being drawn into the ducts 91, 92, 93 in shelves 22. The preferred and most effective embodiment comprises cage lids 130, including valves 160 and seal rings 162 and 131.

Figure 12:
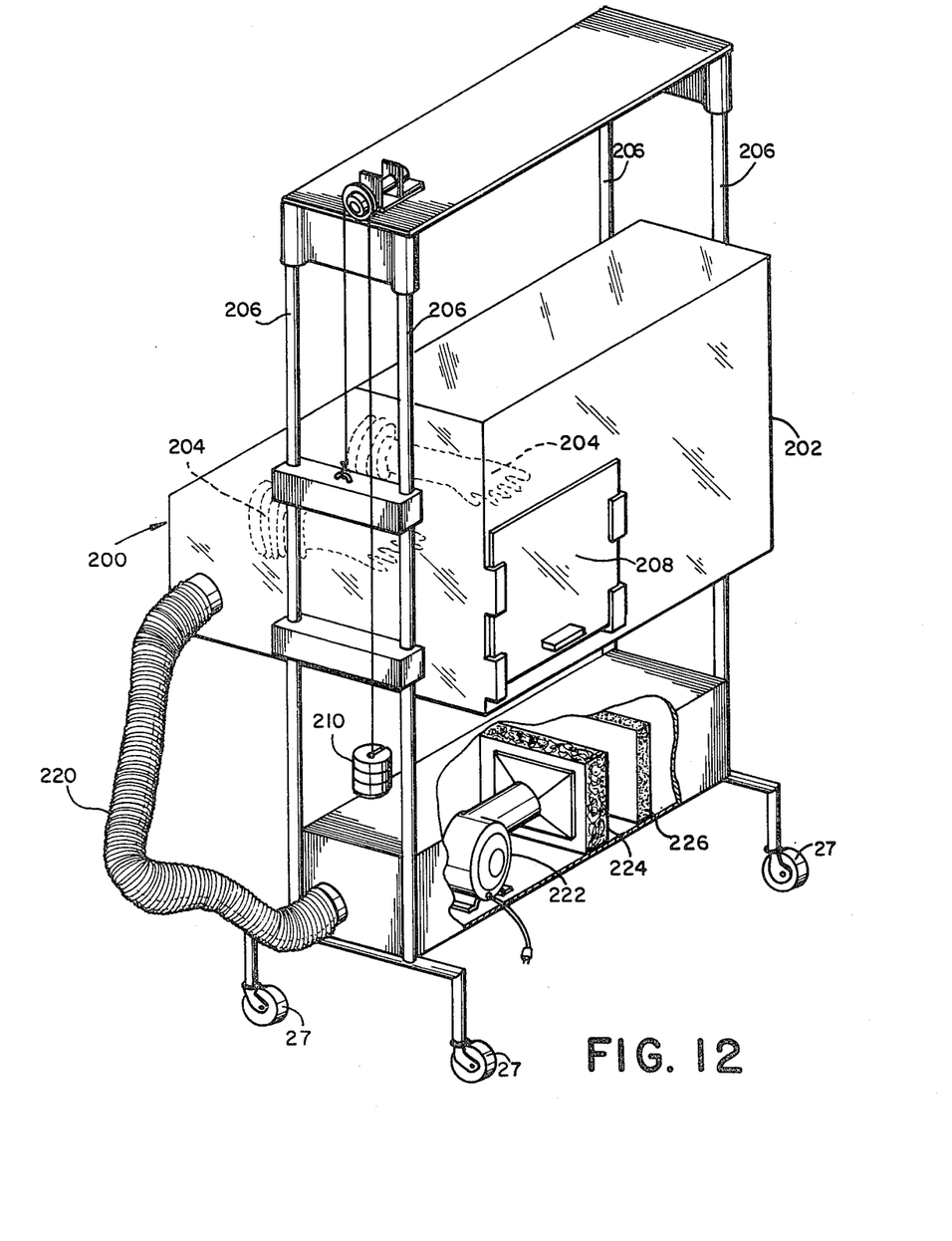
FIG. 12 is a perspective view of an isolation chamber according to the invention.

It is presently contemplated that cages sealed by closure of the valves will be immediately transported to a servicing area, for example, to the isolation chamber of FIG. 12 where an operator may open and service the cage by remote control or using sealed gloves. Upon completion, the re-sealed cage can be disinfected by spraying or dipping, the occupants being safely isolated.

The operation of valves 160 is best illustrated by FIGS. 9, 10 and 11. Plastic lid 130 is molded with a protrusion 134 extending downward for attachment of the remaining valve parts. The protrusion 134 may have a molded thread, or the thread may be machined into the protrusion after molding.

Valve seat 164, piston 166 and spring 168 fit into a bore within protrusion 134. The bore is of small diameter at the top of lid 130, and larger diameter below, to accommodate the seat and piston. Seat 164 is made of a soft plastic material, whereby pressure of piston 166 against seat 164 and seat 164 against lid 130 achieves an airtight fit. Piston 166 is axially bored along its upper length only, and radially bored at a point that is covered by seat 164 when the valve is in an upper, closed position, but below and free of seat 164 when the piston is pushed downward to open the valve. Spring 168 urges the piston upwards to keep it normally closed, the spring pressing against cap 161 and piston 166. Cap 161 is perforated to allow air passing through the bore in piston 166 and thereafter along slots 163 along the lower periphery of the piston, to enter or leave the closed area within cage 20. A simple filter pad 167 is mounted in the exhaust valve to prevent larger particles from being drawn into the exhaust to foul the exhaust valve.

The lid and various valve parts can be made of plastic or metal. It is presently preferred that the lid be a hard clear plastic such as polycarbonate, the seat of a softer plastic or nylon, and the piston, spring and cap of stainless steel. In a system for rodents, occupants are inclined to gnaw on any part which protrudes, thereby requiring that unless a mesh 21 as in FIG. 2 is used, at least cap 161 must be made of metal. Moreover, unless some part is available for gnawing, a confined rodent's health will be adversely affected, the teeth growing continuously. A seal ring 132 is provided in an indentation in lid 130, as before, which completes an airtight seal when pressed against cage 20.

External filtration and air impelling means 50, as depicted in FIG. 1 are included in the presently preferred embodiment. The depicted fan motor 51 powers both supply and exhaust fans 185, 186. For the ultimate in safety, however, a separate motor should be provided in an airtight compartment for each, thereby avoiding contamination of the supply side should the seal fail on the depicted common shaft. Room air is blown through input filter and filtered air is blown into the cage ducts via flexible hose 54. The filter 180 preferred is a HEPA filter which will remove airborne particles down to about 2 or 3 microns. A similar filter is provided on the output side of external means 50 to remove dander and particulate material from air leaving the system. In addition, activated charcoal filter 182 removes ammonia from the exhaust. While rigid connection may be made between external means 50 and the cage rack, flexible hoses 54, 56 are preferred both for convenience in placement of the units and for better vibration isolation. Dampers control differential pressure, as explained above.

The disclosed system is well suited for transporting as well as housing animals. Wheels provided on the rack structure and the external ventilation unit permit movement of the unit by merely pushing it around. To protect flexible hoses 54, 56 a chain can secure external ventilation unit 50 to the rack structure. The ventilation unit can be easily equipped with a rechargeable battery and direct current fan motor for full mobility.

The embodiment of FIG. 10 comprises a single cage having two input and two output valves. The pictured cage can be internally divided below central seal strip 133, using an airtight divider, to match the cage shown in FIG. 2. The upper edge of the divider seals against central strip 133 in the same manner that strip 132 seals the outer edges of cage 20 to lid 130.

In conjunction with the isolation chamber 200 of FIG. 12, the foregoing comprises a complete animal care system. Isolation chamber 200 comprises a transparent box 202 having sealed gloves 204 of rubber or plastic extending therein. A ventilation system comprising hose 200, fan 222, HEPA filter 224 and charcoal filter 226 maintains a negative pressure differential between box 202 and the room, and expels only cleaned air into the room.

The chamber 200 is adapted to interface directly with rack structure 40. An operator inserts his hands into gloves 204 and wheels chamber 200 up to the rack front 28. Box 202 is then raised or lowered along support bars 206 such that door 208 is placed against the shelf 22 just above the desired cage. Counterweight 210 eases raising and lowering of box 202. Box 202 is then lowered, tab 210 contacts shelf 22, and door 208 is opened as the box descends to align with the desired cage. The operator may then pull the cage into box 202. Preferably, the operator would again raise box 202 thereby closing door 208. However, the ventilation system can be operated at very high vacuum and door 208 left open. Once confined in box 202, the cage can be opened and the occupants serviced in safety.

Further variations on the inventive concept disclosed herein are possible and will now be apparent to those skilled in the art. Reference should be made to the appended Claims rather than the foregoing Specification as defining the true scope of this invention.

I claim:

1. A contagion-safe animal housing system, comprising:
    a plurality of animal cages of material impervious to air, the cages mounted in a rack, the rack having internal ducting communicating with air supply and exhaust openings for the cages;
    cage lids sealingly fittable on each of the cages, the lids having air passages corresponding to the air supply and exhaust openings in the rack;
    airflow controlling means located in the lids, the airflow controlling means operable by contact with the rack to open the air passages in the lids upon mounting the cages and biased to close the air supply and exhaust upon withdrawing the cages; and,
    means for supplying and exhausting air to and from said ducting in the rack.

2. The animal housing system of claim 1, further comprising means for accessing the cages including an isolation box having sealed gloves extending therein, said box being mounted on a mobile carriage and openable adjacent the cages, whereby said isolation box can be transported to the vicinity of said cages and the cages can be withdrawn from the rack directly into the box.

3. The animal housing system of claim 2, wherein said isolation box is moveable upon said mobile carriage, said door being a sliding door comprising a contact tab adapted to engage said rack when said box is moved relative to said door.

4. The animal housing system of claim 2, wherein said isolation box comprises a door upon a surface thereof, said door openable by moving said box against said rack, whereby an operator may manually withdraw said cages into the box by pulling the same through said door while using said sealed gloves.

5. The animal housing system of claim 4, further comprising ventilation means adapted to maintain a negative pressure differential between an interior and an exterior of the box, whereby any contagion which may be released in the box will be drawn into said ventilation means.

6. A contagion-safe animal housing system, comprising:
    a hollow rack structure for receiving a plurality of animal cages, the rack structure including internal supply and exhaust airflow channels having openings at each cage position for carrying clean air to said animal cages and for carrying exhaust air from said cages;
    means for supplying the clean air to said supply airflow channels and for withdrawing the exhaust air from said exhaust airflow channels;
    removable cage lids for each of the cages, the lids fitting sealingly on the cages between the cages and the rack when the cages are inserted in the rack; and,
    means for controlling airflow located in the cage lids and having valves at air passages corresponding to the openings of the airflow channels in the rack, the valves being opened by contact with the rack when the cages are inserted in the rack and the valves being biased to close when the cages are withdrawn from the rack.

7. The animal housing system of claim 6, further comprising seal rings disposed between said cage lids and said shelves and between said cage lids and said cages.

8. The animal housing system of claim 6, wherein said cages are joined in sealed pairs of double width and further comprise a single lid, said lid having at least four of said airflow controlling means disposed therein.

9. The animal housing system of claim 6 further comprising means for pressing the cages against the rack when inserted.

10. The animal housing system of claim 6, wherein said means for controlling airflow comprises valves disposed in said flowpaths and having actuation means disposed between said cages and said rack, said valves adapted to open upon substantially full insertion of the cage into said rack and to close upon withdrawal thereof.

11. The animal housing system of claim 6, wherein said means for controlling airflow comprises spring-biased valves disposed in the lids, the valves having actuation means extending, in use, from the lids toward the rack, said valves actuated by contact between the actuation means and the rack, to open upon substantially full insertion of the cage into the rack, and to close upon withdrawal thereof.

12. The animal housing system of claim 11, wherein said actuation means comprises spring-loaded pistons disposed in said lid and reciprocable toward and away from the cage, the pistons extending beyond said lids when said valves are closed, whereby upon substantially full cage insertion said pistons engage said rack and open said valves.

13. The animal housing system of claim 6, wherein said rack comprises: hollow, cage supporting shelves internally divided lengthwise into shelf ducts forming said supply and exhaust airflow channels, each of said shelf ducts being closed at one end thereof and open at the other end thereof; and, at least one hollow end face member having integral ducts communicating with said shelf ducts and said air supply and exhaust means.

14. The animal housing system of claim 13, wherein said shelf ducts are each closed at the same one end thereof, and open at the same opposite end thereof to a single hollow end face, said single hollow end face being internally divided lengthwise into at least one supply duct and at least one exhaust duct communicating with said air supply and exhaust means.

15. The animal housing system of claims 13 or 14, wherein said cages comprise cage flanges along upper edges thereof, and said shelves comprise cage supporting flanges depending therefrom, said shelf flanges being substantially flat and said cage flanges having a thicker, flat central area and progressively thinner end portions, whereby said cages can be easily inserted but upon full insertion are firmly urged against said shelves.

16. The animal housing system of claim 13 further comprising wheels disposed on said rack structure and on said air supply and withdrawing means, whereby said animal housing system is self-contained and operable to transport animals.

* * * * *